United States Patent [19]

Mönch et al.

[11] 4,159,627

[45] Jul. 3, 1979

[54] EXHAUST PIPE FOR AN INTERNAL COMBUSTION ENGINE

[75] Inventors: Werner Mönch, Ilvesheim; Walter Ziemer, Viernheim, both of Fed. Rep. of Germany

[73] Assignee: Motoren-Werk Mannheim AG vorm. Benz Abt. Stat. Motorenbau, Mannheim, Fed. Rep. of Germany

[21] Appl. No.: 799,122

[22] Filed: May 20, 1977

[30] Foreign Application Priority Data

Jun. 9, 1976 [DE] Fed. Rep. of Germany ....... 2625788

[51] Int. Cl.² .............................................. F01N 7/10
[52] U.S. Cl. ........................................ 60/322; 60/323; 60/605
[58] Field of Search .......................... 60/323, 605, 322

[56] References Cited

U.S. PATENT DOCUMENTS

| | | | |
|---|---|---|---|
| 2,390,913 | 12/1945 | Barrett | 60/323 |
| 2,423,574 | 7/1947 | Barrett | 60/323 |
| 2,479,318 | 8/1949 | Cramer | 60/323 |
| 2,660,031 | 11/1953 | Tromel | 60/323 |
| 2,886,945 | 5/1959 | Hofer | 60/323 |
| 3,077,071 | 2/1963 | Leichtfuss | 60/323 |
| 3,490,794 | 1/1970 | Swanson | 60/324 |

*Primary Examiner*—Douglas Hart
*Attorney, Agent, or Firm*—Haseltine, Lake & Waters

[57] ABSTRACT

An exhaust pipe for connecting an exhaust gas outlet of each of a plurality of in-line cylinders of a turbo-supercharged internal combustion engine to a turbine of an exhaust gas turbo-supercharger. The exhaust pipe comprises four separate pipe strings having parallel axes located at the corners of a substantially equal-sided quadrilateral, a branch pipe for connecting the exhaust-gas outlet of each cylinder to the pipe strings, each branch pipe leading to one of the two corners of one side of the quadrilateral, and a connecting part provided in the pipe strings, said connecting part being arranged to twist the pipe strings whereby the parallel portions of an upstream part of the pipe strings and associated with that side of the quadrilateral remote from said one side communicate with the parallel portions of a downstream part of the pipe strings and associated with said one side of the quadrilateral.

7 Claims, 9 Drawing Figures

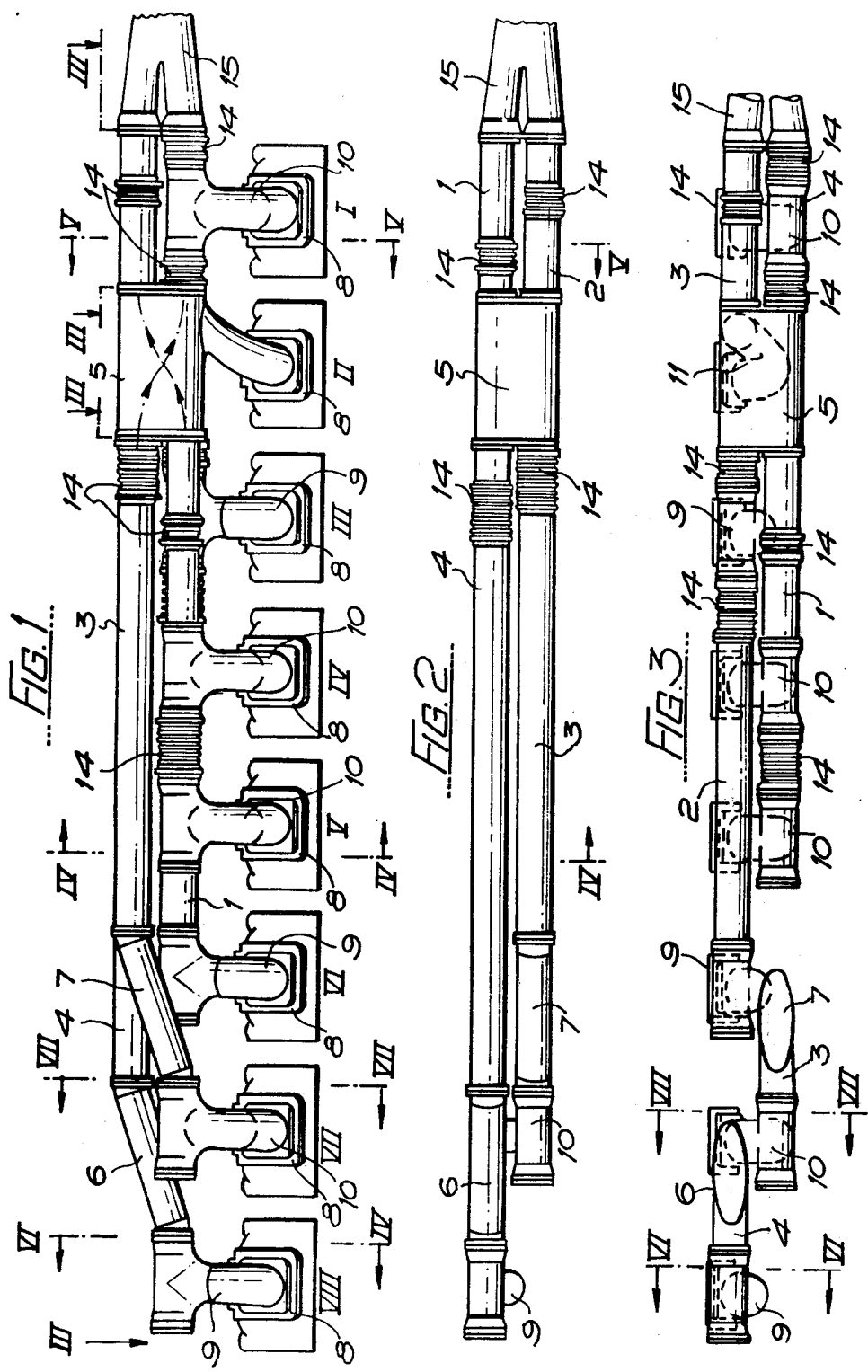

EXHAUST PIPE FOR AN INTERNAL COMBUSTION ENGINE

FIELD OF THE INVENTION

This invention relates to an exhaust pipe for connecting a plurality of cylinders of a turbo-supercharged internal combustion engine arranged in a row to the turbine of an exhaust-gas turbo-supercharger.

Essentially, the exhaust pipe comprises four separate pipe strings extending rectilinearly and parallel to one another over the major part of their length, the pipe strings being so arranged in the form of a group that the axes of their parallel portions are located at the corners of a quadrilateral.

DESCRIPTION OF THE PRIOR ART

An exhaust pipe of the above-mentioned type is shown, for example, in the drawing of U.S. Pat. No. 2,674,086. In this construction, the axes of the four pipe strings are located at the corners of an unequal-sided quadrilateral, the two pipe strings disposed nearest to the exhaust-gas outlets of the cylinders being shifted apart so that individual branch pieces connecting the relevant exhaust-gas outlets to the two further distant pipe strings can be passed through the gap formed.

OBJECT OF THE INVENTION

In contrast with the foregoing, it is the object of the present invention to reduce the cross-section of, and consequently the space required for, the group of four pipe strings, thus simplifying production of the exhaust pipe, and also improving its flow characteristics.

SUMMARY OF THE INVENTION

According to the present invention there is provided an exhaust pipe for connecting an exhaust gas outlet of each of a plurality of in-line cylinders of a turbo-supercharged internal combustion engine to a turbine of an exhaust-gas turbo-supercharger, the exhaust pipe comprising:

four separate pipe strings having first and second ends and including parallel portions extending rectilinearly over a major part of the lengths of the pipe strings, the pipe strings being arranged so that the axes of said parallel portions are located at the corners of a substantially equal sided quadrilateral having one side positionable adjacent said gas outlets and an opposite side positionable remote from said gas outlets;

a respective branch pipe for connecting the exhaust-gas outlet of each cylinder to the pipe strings, each branch pipe leading to one of the two corners of said one side of the quadrilateral;

a connecting part provided in said pipe strings intermediate said first and second ends; and upstream and downstream parts of said pipe strings interconnected by said connecting part, said connecting part being arranged to twist the pipe strings whereby the parallel portions of said upstream part and associated with said opposite side of the quadrilateral communicate with the parallel portions of said downstream part and associated with said one side of the quadrilateral.

Due to the arrangement of the axes of the pipe strings at the corners of a substantially equal-sided quadrilateral a very compact design of the group of pipes is made possible wherein the separate pipe strings are located very close beside one another, so that no branch pipes can be passed through between the pipe strings. This exhaust pipe is suitable for all supercharged four-stroke engines employing impulse superchanging and having, for example, seven, eight and ten cylinders arranged in a row.

In engines having these numbers of cylinders, four pipe strings are required per row of cylinders in order to ensure that only cylinders whose exhaust surges take place staggered in time by a crank angle of at least 240° are connected to the same pipe string. This known principle of exhaust-pipe design for impulse supercharging is intended to prevent the exhaust surge of the later-firing cylinder disturbing the scavenging process of the earlier-firing cylinder.

The compact pipe-string arrangement according to the invention is particularly advantageous in the case of V engines having fourteen, sixteen and twenty cylinders and s small V angle, in which two groups each consisting of four pipe strings, i.e., one group for each row of cylinders, must be accommodated in the narrow space between the two rows of cylinders.

Owing to the fact that the branch pipes are led to the corners of the quadrilateral, their length is approximately the same and, moreover, is relatively small. The cost of manufacturing the branch pipes is reduced to a minimum not only as a result of the relatively short type of construction, but also owing to the fact that only two types of branch pipes are needed for the exhaust pipe, if the small component part in which the pipe strings are twisted with respect to one another is disregarded.

Because of its smallness, this component part can be produced relatively cheaply as a casting. Moreover, the design described has advantages as regards flow technique, because short uniform branch pipes have a lesser tendency to produce reflections which disturb the supercharging process. The twisting of the piper strings creates the conditions enabling the branch pipes of all the pipe strings to be led to that side of the group which is nearest the exhaust-gas outlets of the cylinders. Accordingly, it is not necessary to lead the branch pipes around the group of pipe strings.

The fact that the pipe strings are twisted with respect to one another only in the region of one cylinder has the advantage of greater simplicity and better controllability of the problem of thermal expansion in comparison with a known construction according to German Patent Specification No. 831,035.

As shown in U.S. Pat. No. 2,423,574, a cruciform insert piece has indeed already been twisted only in a partial zone in order to divide an exhaust pipe into four chambers, but such an insert can be equipped with expansion pieces only with great difficulty and then, moreover, only be foregoing mutual hermetic sealing of the four chambers, as shown in German Patent Specification No. 1,025,211.

In the present case, in contrast to the foregoing, a simple expansion member can be installed with advantage in each pipe string, this expansion member being located between the connection points of the branch pipes. These expansion members may be in the form of bellows, i.e., the separate pipe strings are sealed hermetically both outwardly and with respect to one another, which is absolutely essentially with high degrees of supercharging, i.e., high exhaust-gas pressures.

The compactness of the group of pipe strings and the accessibility of the fixing means of the expansion members are promoted in an advantageous manner by the fact that the expansion members in the four pipe strings may be staggered with respect to one another in the longitudinal direction of the latter.

The uniformity of the branch pipes which has already been mentioned as advantageous is achieved in a very simple manner at the free end of the exhaust pipe in that those pipe strings which lead to the cylinders that are furthest distant from the exhaust-gas turbine are carried obliquely from the branch pipes concerned to that side of the quadrilateral which is farthest distant from the exhaust-gas outlets of the cylinders concerned.

The exhaust pipe becomes usable for the so-called "multi-impulse method" in that the four pipe strings terminate in each case at their ends on the turbine side in a nozzle in manner known per se, the nozzles opening into a mixing pipe connected to the single inlet of the exhaust-gas turbine. This method, which has the object, inter alia, of avoiding reflections, is described, for example, in U.S. Pat. No. 3,726,084.

The exhaust pipe according to the invention is also usable with advantage, however, in the "conventional" impulse supercharging method in that each of the four pipe strings opens at its end on the turbine side in a manner known per se into its own exhaust-gas turbine inlet. In both the above-mentioned methods, the compact design of the group of pipe strings facilitates connection to the exhaust-gas turbine.

For a better understanding of the present invention and to show more clearly how the same may be carried into effect, reference will now be made, by way of example, to the accompanying drawings which show a 16-cylinder four-stroke diesel engine in which eight cylinders are arranged in a row, only the exhaust pipe of one row of cylinders being shown.

BRIEF DESCRIPTION OF THE DRAWINGS

FIG. 1 shows the exhaust pipe from the side as seen from the inside of the V-shaped space between the two rows of cylinders;

FIG. 2 is a plan view of the exhaust pipe as seen from above;

FIG. 3 is a plan view of the two lower pipe strings of the exhaust pipe as seen from the line III—III (FIG. 1);

DESCRIPTION OF PREFERRED EMBODIMENT

Figure 4:
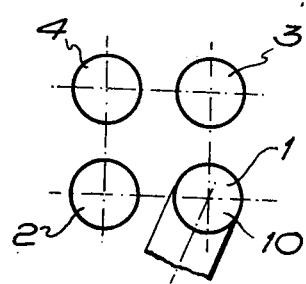
FIG. 4 is a cross-section through the group of pipe strings along the line IV—IV (FIGS. 1, 2)
Figure 5:
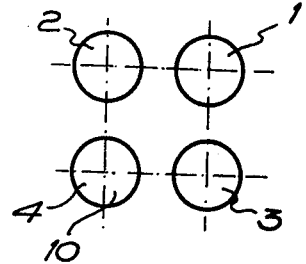
FIG. 5 is a cross-section through the group of pipe strings along the line V—V (FIG. 1,2)
Figure 6:
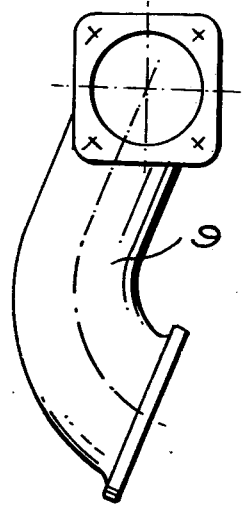
FIG. 6 is a side view of a branch pipe as seen from the line VI—VI (FIGS. 1,3)

The exhaust pipe consists chiefly of the pipe strings 1, 2, 3 and 4 which extend rectilinearly and parallel to one another outside the component part 5, except for the portions 6 and 7. As shown in FIGS. 4 and 5, the axes of these parallel portions are arranged at the corners of an equal-sided quadrilateral. Of course, the sides of this quadrilateral do not have to be absolutely equal, but may show small differences in length due, for example, to the design of the fixing means for the pipe strings. The branch pipes 9 and 10 lead from the exhaust-gas outlets 8 of cylinders I, III, IV, V, VI, VII and VIII to the pipe strings 1, 2 3 and 4. The branch pipe 9 is shown in FIG. 6 and the branch pipe 10 in FIG. 7. Accordingly, there are substantially only two types 9 and 10 of branch pipe, which are approximately of equal length. The branch pipe 11, which leads from the exhaust gas outlet 8 of cylinder II to the component part 5, closely resembles the branch pipe 9. The exhaust-gas outlets 8 of the cylinders IV and V are connected to the pipe string 1, the exhaust-gas outlets 8 of the cylinders III and VI to the pipe string 2, the exhaust-gas outlets 8 of the cylinders II and VII to the pipe string 3, and the exhaust-gas outlets 8 of the cylinders I and VIII to the pipe string 4, the firing order of the cylinder side illustrated being 1- 3- 7- 5- 8- 6- 2- 4. Of course, it will be appreciated by one skilled in the art that the connections could be different for a different firing order.

Figure 8:
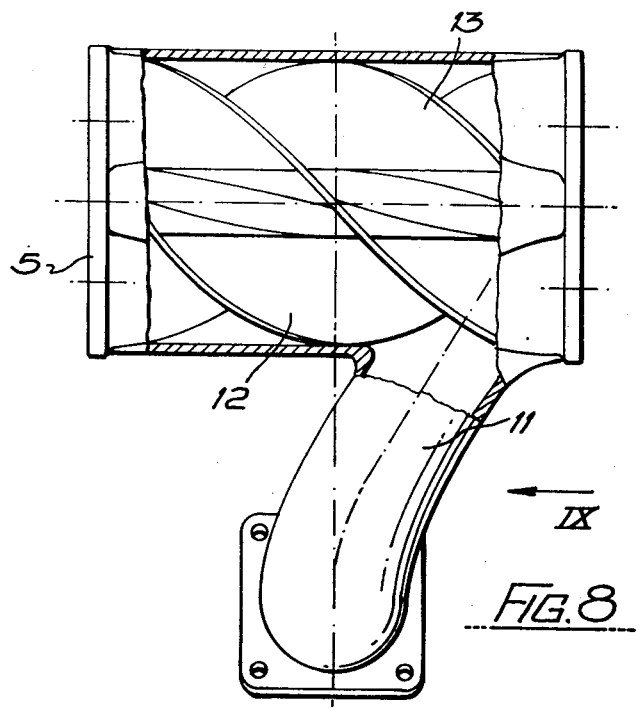
FIG. 8 shows a component part of the exhaust pipe in which the pipe strings are twisted, the component being partly broken away so that the interior is visible.
Figure 9:
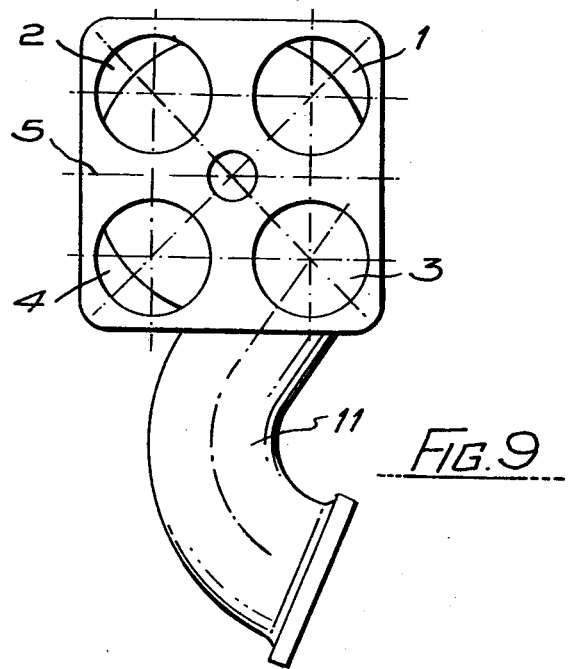
FIG. 9 is a side view of the component part as seen in the direction of the arrow IX (FIG. 8).

Inside the cast component part 5, shown in detail in FIGS. 8 and 9 there are dividing walls 12 and 13 arranged in the form of a cross when seen in section. Together with the outer wall of the component part 5, these dividing walls 12 and 13 form an extension of the walls of the pipe strings 1, 2, 3 and 4. The component part 5 extends approximately over the range of a cylinder. The dividing walls 12 and 13 are twisted in helical form so that the pipe strings 1 and 2 located in the vicinity of the exhaust-gas outlets 8 in that zone of the exhaust pipe which is shown on the left in FIG. 1 are farther distant from the exhaust-gas outlets 8 than the pipe strings 3 and 4 in that zone of the exhaust pipe which is shown on the right in FIG. 1. On the other hand, the pipe strings 3 and 4 which are farther distant from the exhaust-gas outlets 8 in the zone shown on the left in FIG. 1 are nearest to the exhaust-gas outlets 8 in the zone shown on the right in FIG. 1. In this way, it is possible to employ the practically uniform branch pipes 9, 10 and 11 of approximately equal length at all the cylinders.

Figure 7:
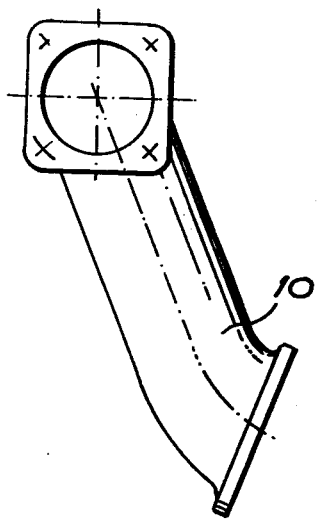
FIG. 7 is a side view of another branch pipe as seen from the line VII—VII (FIGS. 1,3)

It can be seen from FIGS. 6 and 7 that the axes of the branch pipes 9 and 10 lead respectively to one of the two corners of the pipe string quadrilateral shown in FIGS. 4 and 5 which are on that side of the pipe string quadrilateral which is closest to the exhaust-gas outlets 8. Since the component part 5 extends only over the range of a cylinder, the increase in length on heating and the difference in expansion between its outer wall and its dividing walls 12 and 13 are so small that it can be formed as a uniform casting. As a result, production is rendered very much cheaper, in particular because no internal expansion pieces are required. An expansion member in the form of a bellows 14 is installed in each of the pipe strings 1, 2, 3 and 4 between the branch pipes 9 and/or 10. Another bellows 14 is located in each case between the ends of the pipe strings 1, 2, 3 and 4 on the turbine side and the exhaust-gas inlets of the part 15, in which part each pipe string terminates in a nozzle which opens into a commmon mixing pipe. The outlet of the mixing pipe is connected to a single inlet of the turbine (not shown) of the exhaust-gas turbo-supercharger (not shown).

Alternatively, the pipe strings 1, 2, 3 and 4 may also be connected separately to an exhaust-gas turbine (not shown) having four inlets, the part 15 being dispensed with in this case.

The foregoing disclosure and description of the invention are illustrative and explanatory thereof, and it will be appreciated by one skilled in the art that various changes may be made without departing from the spirit of the invention.

We claim:

1. An exhaust arrangement for connecting an exhaust gas outlet of each of a plurality of in-line cylinders of a turbo-supercharged internal combustion engine to a turbine of an exhaust-gas turbo-supercharger, the exhaust arrangement comprising: four separate pipes having first and second ends and including parallel portions extending rectilinearly over a major part of the lengths of the pipes, the pipes being arranged so that the axes of said parallel portions are located at the corners of a substantially equal sided quadrilateral having one side positionable adjacent said gas outlets and an opposite side positionable remote from said gas outlets; a plurality of branch, pipes each of said branch pipes connecting the exhaust-gas outlet of each cylinder to one of said first-mentioned pipes, each of said branch pipes leading to one of the two corners of said one side of the quadrilateral; a connecting part provided is said first-mentioned pipes intermediate said first and second sides; and upstream and downstream parts of said first-mentioned pipes interconnected by said connecting part, said connecting part being arranged to twist said first-mentioned pipes whereby the parallel portions of said upstream part and associated with said opposite side of the quadrilateral communicate with the parallel portions of said downstream part and associated with said one side of the quadrilateral; an expansion member positioned in each of said first-mentioned pipes between junctions of said branch pipes; two of said first-mentioned pipes leading to two cylinders farthest from an outlet of said first-mentioned pipes extending obliquely from respective branch pipes to two corners of said opposite side of said quadrilateral; said connecting part being an integral uniform casting comprising helically twisted dividing walls arranged in form of a cross and one outside wall, said connecting part having an axial extent only in the region of one cylinder and connecting to only one of said branch pipes; said branch pipes comprising a plurality of pairs of pipe members of substantially equal length.

2. An exhaust arrangement according to claim 1, wherein expansion members in the four first-mentioned pipes are staggered with respect to one another in the longitudinal direction of the first-mentioned pipes.

3. An exhaust arrangement according to claim 1, wherein the four first-mentioned pipes each terminate in a nozzle, the nozzles opening into a mixing pipe for connection to an inlet of the exhaust gas turbine.

4. An exhaust arrangement according to claim 1, wherein each of said first-mentioned pipes is adapted to be connected to a separate inlet of the exhaust-gas turbine.

5. An exhaust arrangement according to claim 1, wherein the connecting part is short relative to the length of the first-mentioned pipes.

6. An exhaust arrangement according to claim 1, wherein the connecting part is formed integrally with said one branch type.

7. An exhaust arrangement according to claim 1 wherein expansion members in four of said first-mentioned pipes are staggered with respect to one another in longitudinal direction of said first-mentioned pipes, the four first-mentioned pipes terminating in a nozzle, the nozzle opening into a mixing pipe for connection to an inlet of the exhaust gas turbine, each of said first-mentioned pipes being adapted to be connected to a separate inlet of said exhaust-gas turbine, said connecting part being short relative to the length of said first-mentioned pipes, substantially neglectable small thermally cross differences occurring in the expansion of said dividing wall and said outside wall.

* * * * *